United States Patent [19]

Moore

[11] 4,180,099
[45] Dec. 25, 1979

[54] FLUID FLOW CONTROLLER

[76] Inventor: Donald J. Moore, 442 W. 15th, Eugene, Oreg. 97401

[21] Appl. No.: 822,411

[22] Filed: Aug. 8, 1977

[51] Int. Cl.² ............................................. F16K 31/528
[52] U.S. Cl. .............................. 137/624.2; 137/624.11; 239/70
[58] Field of Search ................. 137/624.11, 624.18, 137/624.19, 624.2; 239/70, 66, 69

[56] References Cited

U.S. PATENT DOCUMENTS

| | | | |
|---|---|---|---|
| 3,085,589 | 4/1963 | Sands | 137/462 X |
| 3,275,034 | 9/1966 | Tadlock | 137/624.19 |
| 3,291,154 | 12/1966 | Bounds | 251/51 X |
| 3,372,708 | 3/1968 | Hotchkin | 137/624.2 |
| 3,487,700 | 1/1970 | Emery | 137/624.19 X |

*Primary Examiner*—Alan Cohan
*Attorney, Agent, or Firm*—Oliver D. Olson

[57] ABSTRACT

A fluid inlet passageway communicates at one end with a source of fluid under pressure and at the opposite end with a fluid outlet passageway. A piston type control valve is movable axially in the fluid inlet passageway and is in fluid pressure sealing engagement with the opposite end portions of said passageway but not with an enlarged intermediate portion thereof, at which position of the valve fluid under pressure may pass around the valve and exit the outlet passageway. The valve is switched between said end and intermediate positions by a stepped stop block on the projecting end of the piston rod engageable releasably by an abutment on a cam follower lever which mounts a cam follower roller positioned for engagement with a pair of relatively adjustable cam elements mounted for rotation with a timer shaft driven by a wind-up spring clock timer.

7 Claims, 4 Drawing Figures

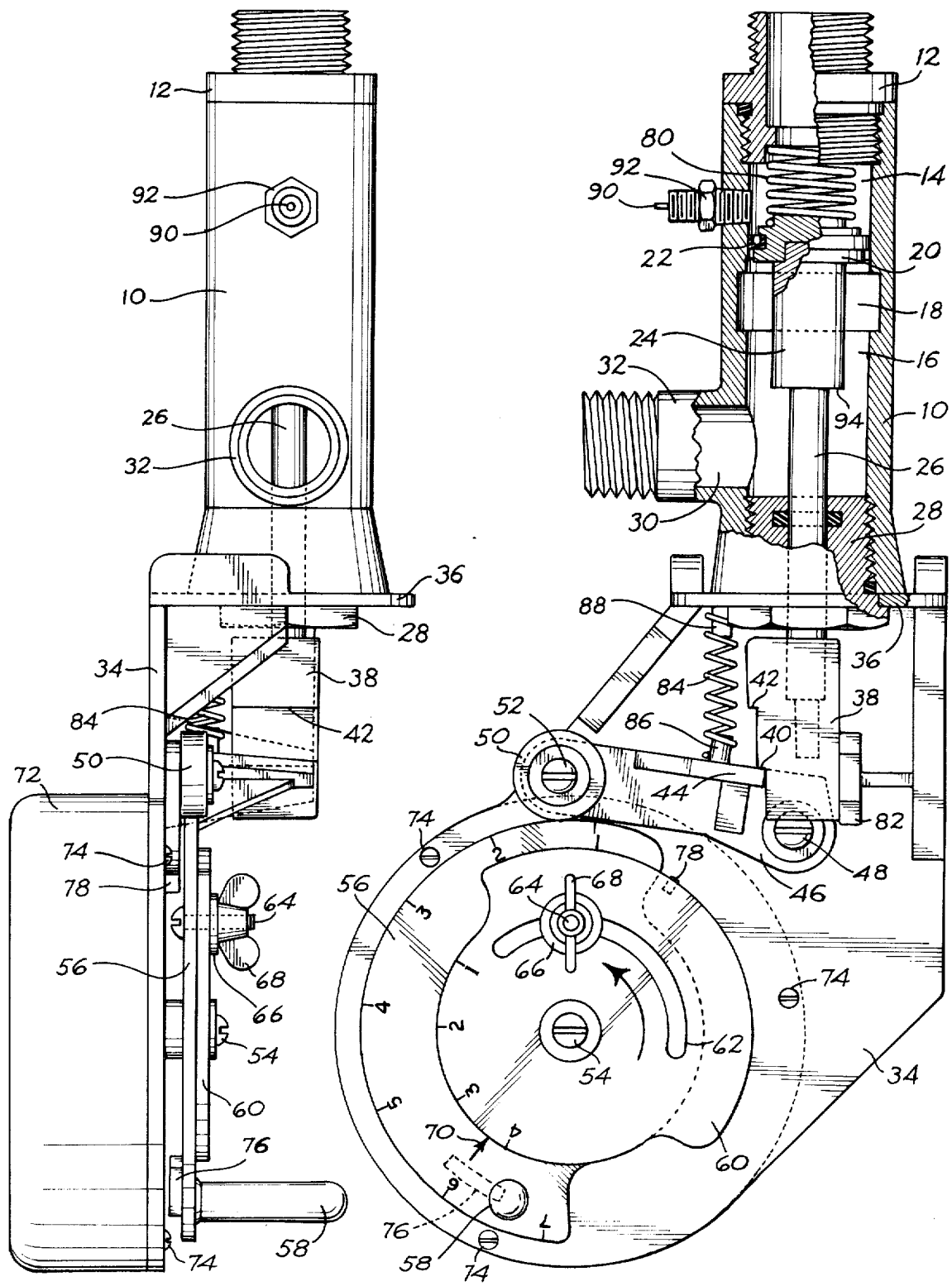

FLUID FLOW CONTROLLER

BACKGROUND OF THE INVENTION

This invention relates to the timed control of the flow of fluid under pressure, and more particularly to a fluid flow controller incorporating a clock timer of the wind-up spring type.

Fluid flow controllers of the prior art embody a variety of constructions and modes of operation. Those incorporating electrical timers are of complex and costly construction and may be utilized only in those situations where a source of electrical power if available and where such electrical power does not present a hazard in the environment of the fluid to be controlled.

Other types of controllers require the fluid pressure being controlled to serve the additional function of operating mechanism, such as impeller driven control gears, to shut off the timer. Controllers of this type also are of relatively complex and costly construction and may be utilized only with fluids that are not corrosive or otherwise damaging to the components of the timer and, conversely, where contamination of the fluid by direct contact therewith of the timer components, is not objectionable. This type of controller also is generally characterized by a mode of operation in which shut-off of the fluid flow is gradual, requiring a substantial period of time for completion. This gradual shut-off decreases the efficiency of the fluid pressure system with which the controller is utilized.

Further, except for the complex and costly timer systems, the fluid flow controllers of the prior art do not provide a preliminary delay time before the controller operates to open the fluid flow system.

SUMMARY OF THE INVENTION

In its basic concept, the fluid flow controller of this invention incorporates a piston type control valve in a fluid pressure inlet passageway timer operated to move the valve sequentially from an upstream inlet sealing position to an intermediate inlet opening position following a predetermined time delay and from the inlet opening position to a downstream inlet closing position following a predetermined fluid flow time.

It is by virtue of the foregoing basic concept that the principal objective of this invention is achieved; namely, to overcome the aforementioned disadvantages and limitations of fluid flow controllers of the prior art.

Another objective of this invention is the provision of a fluid flow controller of the class described which incorporates a rotary cam shaft which may be driven rotationally by a conventional type of wind-up spring clock timer.

A further objective of this invention is the provision of a fluid flow controller which provides an initial delay time prior to initiating fluid flow, the delay time and fluid flow time being adjustable over relatively wide ranges.

Still another objective of this invention is the provision of a fluid flow controller of the class described which comprises a minimum of moving parts, whereby to provide long and faithful operation with a minimum of maintenance and repair.

A still further objective of this invention is the provision of a fluid flow controller of the class described which is of simplified construction for economical manufacture.

The foregoing and other objects and advantages of this invention will appear from the following detailed description, taken in connection with the accompanying drawings of a preferred embodiment.

BRIEF DESCRIPTION OF THE DRAWINGS

FIG. 1 is a plan view, partly in section, of a fluid flow controller embodying the features of this invention, the components being disposed in the position providing an initial delay time prior to fluid flow.

FIG. 2 is a side elevation as viewed from the left in FIG. 1.

DESCRIPTION OF THE PREFERRED EMBODIMENT

Figures 3, 4:
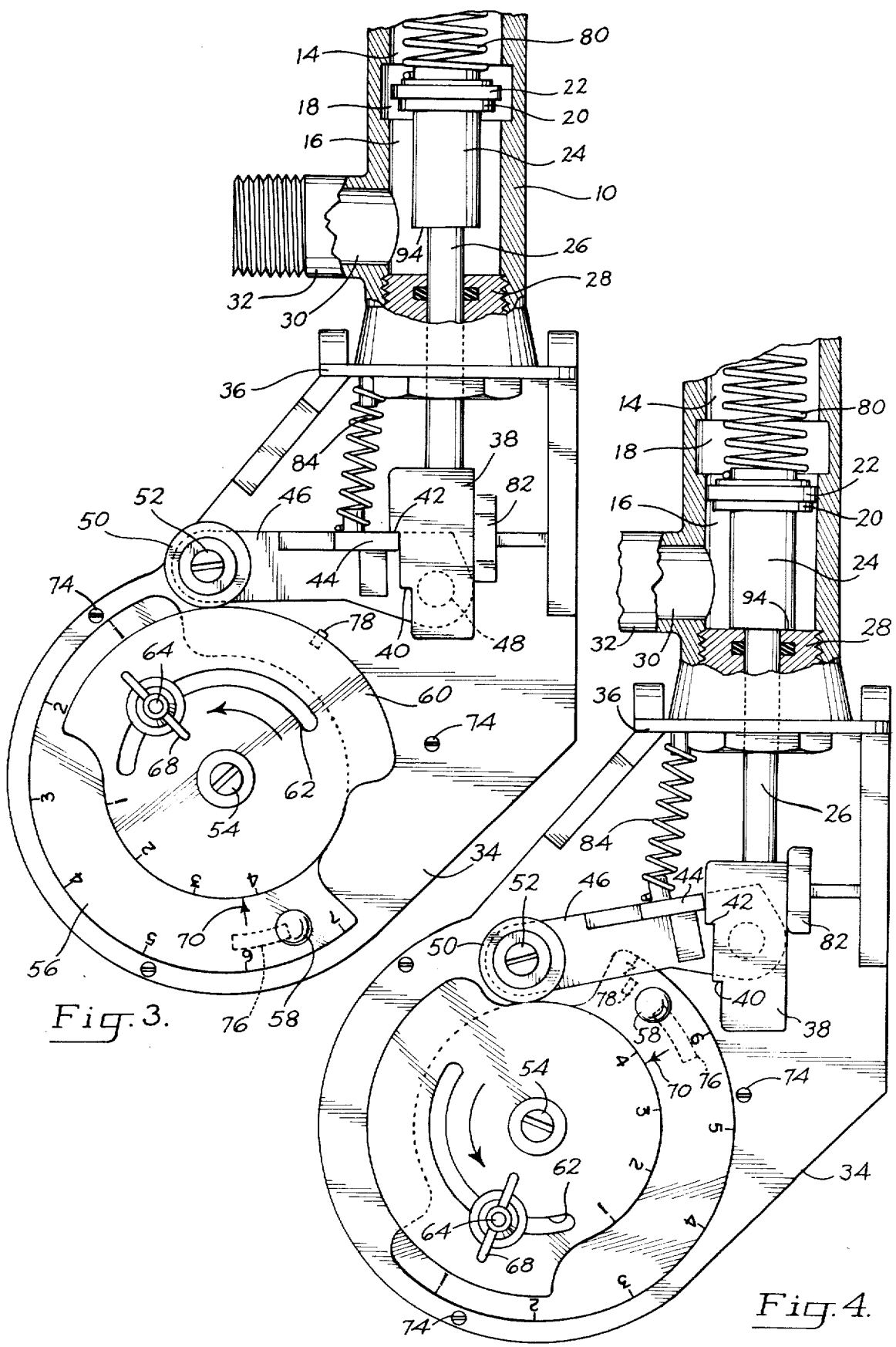
FIG. 3 is a fragmentary plan view, similar to FIG. 1, showing the components in the position providing fluid flow.
FIG. 4 is a fragmentary plan view, similar to FIGS. 1 and 3, showing the components in the fluid shut-off condition following fluid flow and preliminary to resetting to the position of FIG. 1.

Although the controller of this invention may be utilized to control the flow of a wide variety of gaseous and liquid fluids under pressure, it has particular utility in the control of water under pressure to a lawn sprinkling system. Accordingly, the following description will refer to that particular use, merely for purposes of illustration.

The controller includes a hollow housing 10 which provides an internal inlet passageway for the flow of fluid under pressure. The inlet end of the housing is threaded internally for the removable reception of an externally threaded end portion of an adapter 12, the opposite externally threaded end portion of which is adapted for connection of a conventional water hose coupling. An O-ring fluid pressure seal is provided between the housing and adapter, in conventional manner.

The internal inlet passageway in the housing is formed in three sections; namely, an upstream end section 14, a downstream end section 16 of equal diameter and an intermediate section 18 of enlarged diameter. Reciprocative axially in the passageway is a piston type control valve. The piston 20 is provided with an annular seal 22 dimensioned for sliding sealing engagement with the internal wall of the housing defining the end passageway sections 14 and 16. The enlarged diameter inner end section 24 of a piston rod is secured to the piston, as by a press fit, and the outer reduced diameter section 26 of the piston rod extends slidably through an axial bore in a threaded plug 28 which closes the downstream end of the housing.

Communicating with the downstream portion 16 of the inlet passageway is a fluid outlet passageway 30 provided by an outlet fitting 32 which is secured to the housing and extends laterally outward therefrom. The outer end of the fitting is threaded externally for connection of a coupling associated with the exemplified lawn sprinkling system, or other system which utilizes the fluid pressure from the controller.

The downstream end of the hollow valve housing is secured to a timer base. In the embodiment illustrated, the base includes a flat plate 34 provided at one end with a perpendicularly offset flange 36. The flange is provided with an opening for reception of the plug 28. The enlarged head of the plug thus abuts the inner side of the flange and the downstream end of the housing 10 abuts the opposite, outer side of the flange, whereby the housing is secured removably to the timer base.

The end of the piston rod section 26 which projects outwardly through the plug mounts a piston-adjusting stop block 38. The stop block is stepped longitudinally, providing a pair of longitudinally spaced shoulders 40 and 42 intermediate its ends. These shoulders cooperate selectively with a catch 44 formed on a cam follower lever 46 which is mounted on the base plate 34 for pivotal movement about its mounting screw 48.

The opposite end of the cam follower lever mounts a cam follower. In the preferred embodiment illustrated, the cam follower is a roller 50 mounted for rotation on its mounting screw 52 secured to the end of the cam follower level opposite its mounting screw 48.

Associated with the cam follower 50 is a pair of cams mounted for rotation about the axis of a cam drive shaft 54 which extends through the base. As described in detail hereinafter, the larger radius cam 56 functions to delay opening of the inlet passageway to the outlet passageway for a predetermined period of time. It is secured to the shaft 54 for rotation therewith, and is provided with a handle 58 for rotating it manually to desired positions of adjustment. It is provided on its exposed surface adjacent its operating circumference with graduation markings to indicate in hours and/or minutes the delay time prior to opening the inlet passageway to the flow of fluid under pressure to the outlet passageway. The graduation markings associated with an index which, in the embodiment illustrated, is provided by the point of contact of the cam follower roller 50 with the circumference of the cam.

The smaller radius cam 60 is mounted freely on the shaft 54 for rotation relative thereto. It is provided with an arcuate slot 62 radially outwardly from the shaft, and the slot receives freely therethrough a screw 64 which is secured to the larger radius cam 56. A washer 66 on the screw overlies the smaller radius cam, and a wing nut 68 is threaded onto the screw for releasably clamping the smaller radius cam frictionally to the larger radius cam in any desired position of rotational adjustment of the smaller radius cam relative to the larger radius cam. The smaller radius cam also preferably is provided with graduations indicating the hours and/or minutes that fluid under pressure will flow through the inlet passageway to the outlet passageway. The graduations are referenced to an index marker 70 provided on the larger radius cam.

The cam drive shaft 54 is powered by a timer. Although the timer may be of any conventional form, including the electrically driven type, it is preferred that the timer be of the manual wind-up spring clock type such as is used on parking meters. Thus, the cover 72 illustrated in FIG. 2 is secured removably to the base 34 by means of screws 74, and it confines therein the wind-up spring and clock mechanism of the timer. The output driven shaft 54 is coupled to the timer and extends through an opening in the base for mounting the cam elements 56 and 60 described hereinbefore.

The spring is wound by grasping the handle 58 and rotating the cam assembly clockwise. To prevent overwinding of the spring, a projection 76 on the underside of the larger radius cam 56 is positioned so that its leading end, during clockwise rotation, is brought into abutment with a stop 78 projecting upwardly from the base. The opposite end of the projection 76 abuts the stop after counterclockwise rotation of the cam assembly has completed a cycle of operation, as described hereinafter.

A coil spring 80 is interposed between the upstream side of the piston 20 and the confronting end of the adapter 12, to urge the piston and its rod and stop block assembly resiliently in the downstream direction to maintain each of the shoulders 40 and 42 in firm abutment with the catch 44, when there is no fluid pressure input and also when the piston 20 is in the intermediate section 18 of the inlet passageway. The side of the stop block opposite the shoulders slidably abuts the surface of a structural backing bracket 82 which prevents movement of the stop block away from the catch.

A coil spring 84 extends between the cam follower lever 46 and the flange 36 of the base, being confined at its opposite ends on the pegs 86 and 88, to urge the cam follower roller 50 resiliently into contact with the cam elements.

Means is provided for relieving the fluid pressure on the upstream side of the piston 20 after the latter has been moved to the downstream section 16 of the inlet passageway following the time period of fluid flow, to enable resetting of the controller. In the embodiment illustrated, a spring-loaded pressure relief valve 90, conveniently of the type utilized in conventional pneumatic tires, is contained in a housing 92 which is secured in a threaded opening in the valve housing 10 for communication with the upstream section 14 of the passageway. By pressing the stem of the valve inwardly, the valve is opened, whereby to relieve to the atmosphere any superatmospheric fluid pressure within the passageway upstream from the piston.

The operation of the fluid flow controller described hereinbefore now will be explained. For this purpose, let it be assumed that the inlet adapter 12 is connected to a conventional water hose coupling leading from a source of water under pressure, and that the outlet fitting 32 is coupled to a lawn sprinkler system.

With reference to FIG. 1 of the drawings, let it be further assumed that it is desired to delay operation of the lawn sprinkler system for about eighty minutes and thereafter to operate the sprinkler system for a period of about three and three-fourths hours. Accordingly, the wing nut 68 is loosened and the smaller radius cam 60 is rotated until the index mark 70 registers with a point about three-fourths the distance from the graduation marking 3 on the cam 60 toward the graduation mark 4, whereupon the wing nut is tightened to secure the smaller radius cam securely to the larger radius cam for simultaneous rotation therewith. This setting of three and three-fourths hours establishes the time during which the lawn sprinkling system is to be in operation. The operator then grasps the handle 58 and rotates the cam assembly clockwise until the point of contact of the cam follower roller 50 with the circumference of the larger radius cam 56 is about one-third the distance between the graduation marks identified by the numerals 1 and 2. This position of one and one-third hours, or eighty minutes, establishes the initial delay period before the sprinkler system is to be operated.

Simultaneously with the clockwise rotation of the larger radius cam, and the shaft 54, the timer clock spring has been wound proportionately to enable operation of the timer. In this regard, it is to be understood that the timer block spring is initially pre-wound to a sufficient degree as to enable counterclockwise rotation of the cam assembly through nearly one revolution, when rotation will be stopped by abutment of the projection 76 on the underside of the cam with the stop 78 on the base.

With the source of water under pressure turned on, water pressure is applied to the upstream end of the valve piston 20. That water pressure, together with the force exerted by the spring 80, tends to urge the piston in the downstream direction. However, such movement of the piston is prevented because the catch 44 on the cam follower lever 46 engages the outer shoulder 40 on the stop block 38. Accordingly, the piston is retained in the upstream section 14 of the passageway to prevent the flow of water through the outlet passageway 30 to the lawn sprinkler system until the lapse of about eighty minutes.

Upon the lapse of eighty minutes, the cam assembly will have been rotated counterclockwise, substantially to the position of FIG. 3, whereupon the cam follower roller 50 will have moved radially inward into contact with the circumference of the smaller radius cam 60. Inward movement of the cam follower roller, under the urging of the coil spring 84, results in counterclockwise pivoting of the cam follower lever 46 about its pivot screw 48. This pivoting of the lever results in outward retraction of a catch 44 from the outer shoulder 40 of the stop block, whereupon the force of the water under pressure combined with the force of the coil spring 80, causes the piston 20 and its connected rod and stop block to move in the downstream direction until the inner shoulder 42 of the stop block abuts the catch 44 (FIG. 3). In this position the control valve piston 20 is in registry with the intermediate, enlarged diameter section 18 of the inlet passageway. Accordingly, water under pressure from the source passes around the piston, through the downstream section 16 of the passageway and thence through the outlet passageway 30 to the lawn sprinkler system.

The lawn sprinkler system thus remains activated for the set period of three and three-fourths hours, during which time the clock timer continues to rotate the cam assembly counterclockwise, the cam follower roller 50 tracking along the circumference of the smaller radius cam 60.

With the passage of three and three-fourths hours, the cam follower roller reaches the end of the smaller radius cam segment, and is forced radially inward, under the influence of the coil spring 84 urging counterclockwise rotation of the cam follower lever 46. The cam follower roller thus is brought into engagement with the minimum radius cam surface of the cam assembly (FIG. 4). During this rotation of the lever 46, the catch 44 disengages from the inner shoulder 42 of the stop block, allowing the assembly of the piston, piston rod and stop block to move further in the downstream direction, until the shoulder 94 formed between the larger and smaller diameter sections 24 and 26 of the piston rod abuts the inner end of the plug 28. In this position the piston valve has entered the downstream section 16 of the inlet passageway and is in sealing engagement with the inner wall of the housing defining said downstream section. Accordingly, water under pressure from the source once again is sealed from the outlet passageway 30. The end of the projection 76 on the underside of the larger radius cam 56 leading in the counterclockwise direction of rotation thereof, has been brought into abutment with the stop 78 on the base 34, whereby to prevent further counterclockwise rotation of the cam assembly. The cycle of operation of the controller thus is completed.

To reset the controller to the start position of a subsequent cycle, as illustrated in FIG. 1, the source of water under pressure is shut off, the stem of relief valve 90 is pushed inward to communicate the inlet passageway upstream from the piston 20 to the atmosphere, to relieve the water pressure in the inlet passageway on the upstream side of the piston. The operator then applies hand pressure to the outer end of the stop block 38 to force the latter and the connected piston rod and piston inwardly, i.e. in the upstream direction of the inlet passageway, until the piston has been returned to the upstream section 14 of the passageway, as illustrated in FIG. 1. The piston and stop block assembly is retained in that position by grasping the handle 58 and rotating the cam assembly clockwise until the cam follower roller 50 once again engages the cam surface of the larger radius cam 56, whereupon the outer shoulder 40 of the stop block engages the catch 44 on the cam follower lever.

From the foregoing it will be apparent that the present invention provides a simplified and economical device for controlling the flow of a wide variety of gaseous and liquid fluids under pressure. The timer mechanism is isolated from the fluid under pressure and hence neither is adversely affected by the other. The timer is adjustable over a substantial range of time, both as to preliminary delay before fluid flow is initiated and as to the time period of fluid flow. The timer conveniently may be of the inexpensive manual wind-up spring clock mechanism such as is used in parking meters. The controller of this invention involves a minimum of moving parts, thereby contributing to long service life with a minimum of maintenance and repair.

It will be apparent to those skilled in the art that various changes may be made in the size, shape, type, number and arrangement of parts described hereinbefore. For example, the stepped stop block 38 may be provided with a third shoulder, inwardly of the inner shoulder 42, to replace the shoulder 94 formed between the different diameter sections of the piston rod. The pair of cams may be replaced with a single cam to provide a single, preset fluid pressure flow time, as afforded by the circumference of the smaller radius cam 60, while retaining the variable preliminary delay time afforded by the circumference of the larger radius cam 56.

Having now described my invention and the manner in which it may be used, I claim:

1. A controller for the flow of fluid under pressure, comprising:
(a) a base,
(b) a hollow housing on the base defining a fluid inlet passageway having upstream and downstream end sections of equal diameter and an intermediate section of larger diameter, the upstream end section being arranged for communication with a source of fluid under pressure and the downstream end section being arranged for communication with a fluid pressure outlet,
(c) a piston valve reciprocative in the inlet passageway and dimensioned for fluid sealing engagement with said upstream and downstream end sections and for fluid passage around the valve when in said intermediate section,
(d) a piston rod extending through the housing, and
(e) timer-controlled drive means on the base engaging the outer end of the piston rod for moving the piston sequentially from the upstream section of the inlet passageway to the intermediate section thereof and thence to the downstream section, the timer-controlled drive means comprising:

(1) a stepped stop lock on the outer end of the piston rod providing a plurality of longitudinally spaced shoulders, (2) a cam follower lever mounted pivotally on the base, (3) a cam follower on the lever, (4) cam means mounted on the base for movement relative to the cam follower for effecting pivoting of the cam follower lever, (5) a catch on the cam follower lever arranged to engage the shoulders on the stop block selectively in response to pivoting of the cam follower lever by the cam means, and (6) timer-controlled power means engaging the cam means for moving the latter.

2. The controller of claim 1 including resilient means interengaging the piston valve and housing for urging the piston valve resiliently in the downstream direction of the inlet passageway.

3. The controller of claim 1 wherein:

(a) the cam means comprises a pair of rotary cams of different radii mounted for rotation about a common axis and arranged for engagement by the cam follower, (b) the larger radius cam cooperating with the cam follower to provide a predetermined time delay during which the piston valve is retained in the upstream section of the inlet passageway before it is moved to the intermediate section thereof, (c) the smaller radius cam being secured to the larger radius cam and cooperating with the cam follower to provide a predetermined time delay during which the piston valve is retained in the intermediate section of the inlet passageway before it is moved to the downstream section thereof, and (d) a timer-driven rotary shaft is secured to the larger radius cam for simultaneous rotation.

4. The controller of claim 3 wherein the smaller radius cam is secured releasably to the larger radius cam for rotational adjustment relative thereto for varying the time during which the piston valve is retained in said intermediate section of the inlet passageway.

5. The controller of claim 3 wherein the timer comprises a manual wind-up spring type clock timer profiding rotary drive power for said rotary shaft.

6. The controller of claim 5 including a handle on the larger radius cam for adjusting the latter to a desired preliminary delay time while simultaneously winding up the timer spring.

7. The controller of claim 6 including stop means on the larger radius cam and base arranged for mutual engagement for preventing more than one rotation of the cam.

* * * * *